United States Patent
Vets

(10) Patent No.: US 11,719,823 B2
(45) Date of Patent: Aug. 8, 2023

(54) LIDAR SYSTEM THAT GENERATES A POINT CLOUD HAVING MULTIPLE RESOLUTIONS

(71) Applicant: GM Cruise Holdings LLC, San Francisco, CA (US)

(72) Inventor: Robert Vets, Seattle, WA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 0 days.

(21) Appl. No.: 17/902,788

(22) Filed: Sep. 2, 2022

(65) Prior Publication Data

US 2022/0413152 A1 Dec. 29, 2022

Related U.S. Application Data

(63) Continuation of application No. 16/586,080, filed on Sep. 27, 2019, now Pat. No. 11,467,287.

(51) Int. Cl.
| | | |
|---|---|---|
| *G01S 17/89* | (2020.01) | |
| *G01S 7/481* | (2006.01) | |
| *G01S 7/48* | (2006.01) | |
| *G05D 1/02* | (2020.01) | |
| *G06T 17/05* | (2011.01) | |

(52) U.S. Cl.
CPC ............ *G01S 17/89* (2013.01); *G01S 7/4808* (2013.01); *G01S 7/4817* (2013.01); *G05D 1/0238* (2013.01); *G06T 17/05* (2013.01); *G05D 2201/0213* (2013.01)

(58) Field of Classification Search
CPC ...... G01S 17/89; G01S 7/4808; G01S 7/4817; G01S 7/4815; G01S 17/10; G01S 17/42; G01S 17/931; G05D 1/0238; G05D 2201/0213; G06T 17/05
USPC ......................................................... 356/4.01
See application file for complete search history.

(56) References Cited

U.S. PATENT DOCUMENTS

| | | | |
|---|---|---|---|
| 2019/0235011 A1* | 8/2019 | Pinney | G01W 1/00 |
| 2019/0311546 A1* | 10/2019 | Tay | G05D 1/0088 |
| 2019/0385025 A1* | 12/2019 | McMichael | G06V 10/82 |
| 2021/0096254 A1 | 4/2021 | Vets | |

OTHER PUBLICATIONS

"Notice of Allowance and Fees Due for United States U.S. Appl. No. 16/586,080", dated Jun. 8, 2022, 10 pages.

* cited by examiner

*Primary Examiner* — Muhammad Shafi
(74) *Attorney, Agent, or Firm* — Calfee, Halter & Griswold LLP

(57) ABSTRACT

An autonomous vehicle having a LIDAR system mounted thereon or incorporated therein is described. The LIDAR system has N channels, with each channel being a light emitter/light detector pair. A computing system identifies M channels that are to be active during a scan of the LIDAR system, wherein M is less than N. The computing system transmits a command signal to the LIDAR system, and the LIDAR system performs a scan with the M channels being active (and N-M channels being inactive). The LIDAR system constructs a point cloud based upon the scan, and the computing system controls the autonomous vehicle based upon the point cloud.

20 Claims, 9 Drawing Sheets

LIDAR SYSTEM THAT GENERATES A POINT CLOUD HAVING MULTIPLE RESOLUTIONS

RELATED APPLICATION

This application is a continuation of U.S. patent application Ser. No. 16/586,080, filed on Sep. 27, 2019, and entitled "LIDAR SYSTEM THAT GENERATES A POINT CLOUD HAVING MULTIPLE RESOLUTIONS". The entirety of this application is incorporated herein by reference.

BACKGROUND

An exemplary LIDAR system mounted on or incorporated in autonomous vehicles may be a spinning LIDAR system that includes an array of light emitter/light detector pairs arranged vertically along a rotating spindle of the LIDAR system. Each light emitter/light detector pair is referred to as a "channel" of the LIDAR systems, and each channel corresponds to a respective angular range in elevation. For example, each channel may have a range of three degrees, and thus for a LIDAR system with 16 channels (and assuming no overlap between channels) the vertical field of view of the LIDAR system is 48 degrees in elevation. An angular range in azimuth for each channel depends upon a rotational velocity of the spindle and speed of the electronics of the LIDAR system. In a non-limiting example, the angular range in azimuth for each may be five degrees (and thus each light emitter may emit a light pulse at every 5 degrees of rotation of the spindle). This means that each of the sixteen light emitters would emit 72 light pulses per rotation, resulting in a point cloud for a single rotation having 1,152 points.

Relatively recently, LIDAR systems with a relatively large number of channels have been developed; for example, LIDAR systems with 32 channels and 64 channels have been developed, wherein such LIDAR systems are configured to generate denser point clouds when compared to those generated by LIDAR systems having 16 channels. For instance, with respect to a LIDAR system having 64 channels, and assuming the same angular range in azimuth as noted above, such LIDAR system can create a point cloud for a single rotation having 4,608 points.

Computer-implemented control systems employed in autonomous vehicles have been developed to process point clouds generated by, for example, LIDAR systems having 16 channels, but have not been developed to process point clouds generated by LIDAR systems having 32 channels or 64 channels. Updating control systems is a time-consuming task; in addition, even if such control systems are updated, latency may be introduced due to the relatively large number of points that such control systems are to process. Accordingly, when LIDAR systems with the relatively large number of channels are used with autonomous vehicles, conventionally several of the channels are deactivated. Hence, in an example, with respect to a LIDAR system having 32 channels, every other one of such channels may be permanently deactivated to effectively transform the 32 channel LIDAR system into a conventional 16 channel LIDAR system, such that a control system of an autonomous vehicle can process point clouds output by the LIDAR system. This conventional approach fails to take advantage of the increased number of channels of the LIDAR system.

SUMMARY

The following is a brief summary of subject matter that is described in greater detail herein. This summary is not intended to be limiting as to the scope of the claims.

Described herein are various technologies pertaining to dynamically activating and deactivating channels of a spinning lidar system, wherein a channel is a light emitter/light detector pair. With more specificity, described herein is an autonomous vehicle comprising a LIDAR system and a computing system that generates command signals that are configured to activate and deactivate channels of the LIDAR system. The computing system identifies, for a scan of the LIDAR system, a first subset of channels of the LIDAR system that are to be active during the scan and a second subset of channels of the LIDAR system that are to be inactive during the scan. Hence, a first portion of a point cloud output by the LIDAR system may have a first resolution and a second portion of the point cloud output by the LIDAR system may have a second resolution, wherein the first resolution is greater than the second resolution. Thus, in an example, a first horizontal band in a point cloud that corresponds to a region in an environment where objects are more likely to impact operation of the autonomous vehicle (e.g., a region in the field of view of the LIDAR system where pedestrians are likely to be observed) may have the first resolution while a second horizontal band in the point cloud that corresponds to a periphery of a field of view of the LIDAR system may have the second resolution.

With more particularity, the autonomous vehicle has a control system that is configured to process point clouds that have a predefined number of points. When, however, all channels of the LIDAR system are active, a point cloud generated by the LIDAR system will have a number of points that is greater than the predefined number of points. Rather than permanently deactivating some of the channels of the LIDAR system, the computing system can, per scan of the LIDAR system, ascertain which of the channels are to be active and which of the channels are to be inactive, such that a control system of the autonomous vehicle is able to take advantage of increased resolution in point clouds due to the increased number of channels while not requiring the control system to be redesigned and without introducing latency.

In an exemplary embodiment, the LIDAR system may comprise an array of 32 channels that are aligned vertically along a spindle of the LIDAR system, and the control system of the autonomous vehicle may be configured to process point clouds based upon data output by 16 channels of the LIDAR system. For a scan of the LIDAR system, and based upon, for example, pitch of the LIDAR system, terrain of the environment (e.g., an upcoming hill), an object identified as being in the environment, etc., the computing system can identify a range of elevation angles (e.g., −4 degrees-10 degrees) with respect to a defined plane and can generate a control signal that causes channels that correspond to such range to be active. Thus, a point cloud generated by the LIDAR system may have higher resolution with respect to such range of angles when compared to resolution outside of such range of angles. The computing system can update the range of angles such that, for example, a roadway being traveled upon by the autonomous vehicle is included in the range of angles on the horizon.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
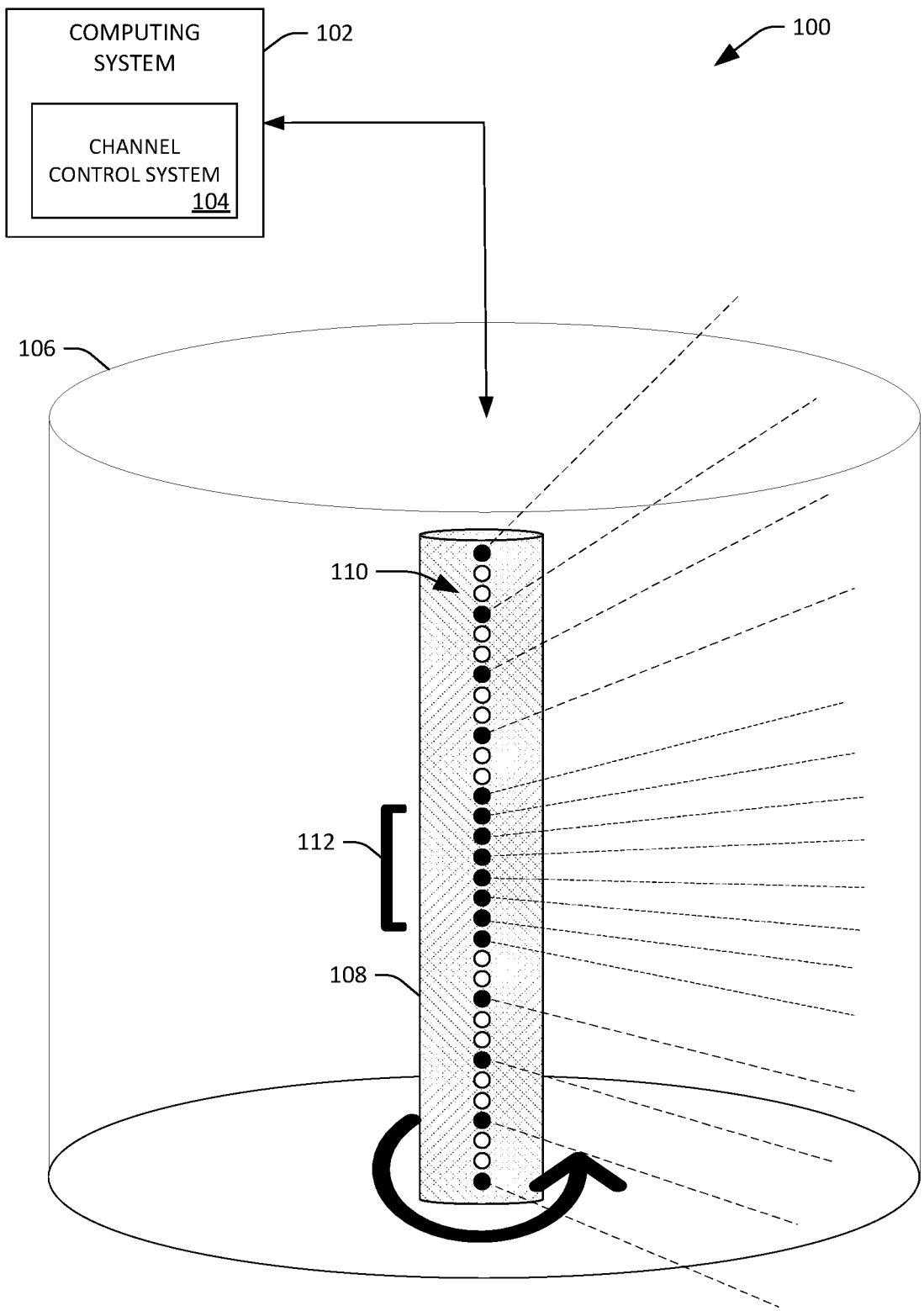
FIG. 1 illustrates an exemplary LIDAR system that is controlled by a computing system of an autonomous vehicle.

Various technologies pertaining to activating and deactivating channels of a LIDAR system as an autonomous vehicle travels are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean serving as an illustration or example of something and is not intended to indicate a preference.

With reference now to FIG. 1, an environment 100 includes a computing system 102 of an autonomous vehicle in communication with a LIDAR system 106 that can be mounted on or incorporated in the autonomous vehicle. The LIDAR system 106, in an example, can include a rotating spindle 108 that has an array of N channels: N light emitters 110 and corresponding N light detectors (not shown), wherein the LIDAR system 106 is designed such that each channel corresponds to an angular range in elevation. For example, the LIDAR system 106 may comprise 32 channels, and each channel may correspond to an angular range of 1.5 degrees in elevation, such that the LIDAR system 106 has an angular range of 48 degrees in elevation. The LIDAR system 106 can be a spinning LIDAR system that has an angular range of 360 degrees in azimuth. While objects of interest in a field of view of the LIDAR system 106 may typically be located, for example, between −4 degrees and 6 degrees in elevation when the autonomous vehicle is on flat terrain, objects may exist outside of such range, and therefore the 32 channels are configured to provide angular coverage for a larger range of elevation angles.

With more specificity, the computing system 102 may execute a control system 104 that is configured to process point clouds generated by LIDAR systems having M channels, wherein M is less than N. For example, the computing system 102 can receive point clouds having 16 horizontal bands that correspond to 16 channels, can identify objects in an environment of the autonomous vehicle based upon the point clouds, and can control a mechanical system of the autonomous vehicle (e.g., a propulsion system, a steering system, and/or a braking system) based upon the point clouds. To take advantage of the additional channels (N-M), the computing system 102 can include a channel control system 104, wherein the channel control system 104, for each scan (spin) of the LIDAR system 106, is configured to identify a set of M channels of the LIDAR system 106 that are to be active and a set of N-M channels that are to be inactive. The channel control system 104 can then cause a command signal to be transmitted to the LIDAR system 106, wherein the LIDAR system 106, upon receiving the command signal, activates the set of M channels and deactivates the set of N-M channels identified by the channel control system 104.

The channel control system 104 can identify the set of M channels that are to be active (and thus the set of N-M channels that are to be inactive) during a scan based upon one or more factors. For instance, the channel control system 104 can identify a set of M channels that are to be active based upon an object being detected in proximity to the autonomous vehicle. With more particularity, the computing system 102 can determine that a pedestrian is walking in proximity to the autonomous vehicle and can further determine that the pedestrian is included within an angular range in elevation of 6 degrees to 15 degrees with respect to the LIDAR system 106. Based upon these determinations, the channel control system 104 can identify channels that correspond to such angular range, and cause such channels to be active (e.g., such that the LIDAR system 106 is "focused" on a horizontal band that includes the pedestrian while less "focused" on a horizontal band that fails to include the pedestrian) during the scan.

In another example, the channel control system 104 can identify a set of M channels that are to be active based upon a tilt of the LIDAR system 106 relative to a horizontal plane. Therefore, when the autonomous vehicle is travelling downhill as the autonomous vehicle enters a freeway (and the tilt relative to the horizontal plane is negative), the channel control system 104 can identify channels that are to be active such that the LIDAR system is "focused" upwards towards the horizon (rather than towards the ground).

In still yet another example, the channel control system 104 can identify channels that are to be active based upon known terrain in proximity to the autonomous vehicle. For example, a three-dimensional map can indicate elevation changes of a roadway upon which the autonomous vehicle is travelling. Based upon such elevation changes, the channel control system 104 can identify M channels of the N channel LIDAR system 106 that are to be active during the scan (e.g., such that the LIDAR system is "focused" with respect to a desired horizontal band).

In a further example, the channel control system 104 can identify channels that are to be active based upon an output of a perception system, a direction of travel of the autonomous vehicle, a velocity of the autonomous vehicle, an acceleration of the autonomous vehicle, or a combination of the factors noted above. In a specific example, the channel control system 104 can identify a horizontal band that corresponds to emitters 112, where a point cloud generated by the LIDAR system 106 is to have higher resolution for the horizontal band than another horizontal band (which corresponds to emitters other than the emitters 112). Thus, rather than every other channel of the LIDAR system 106 being active, the channel control system 104 causes the LIDAR system 106 to generate a point cloud with different resolutions in differing horizontal bands. In addition, it can be ascertained that a channel may be active for one scan of the LIDAR system 106 and then be inactive for an immediately subsequent scan of the LIDAR system 106. Similarly, a channel may be inactive for one scan of the LIDAR system 106 and then be active for an immediately subsequent scan of the LIDAR system 106.

Figure 2:
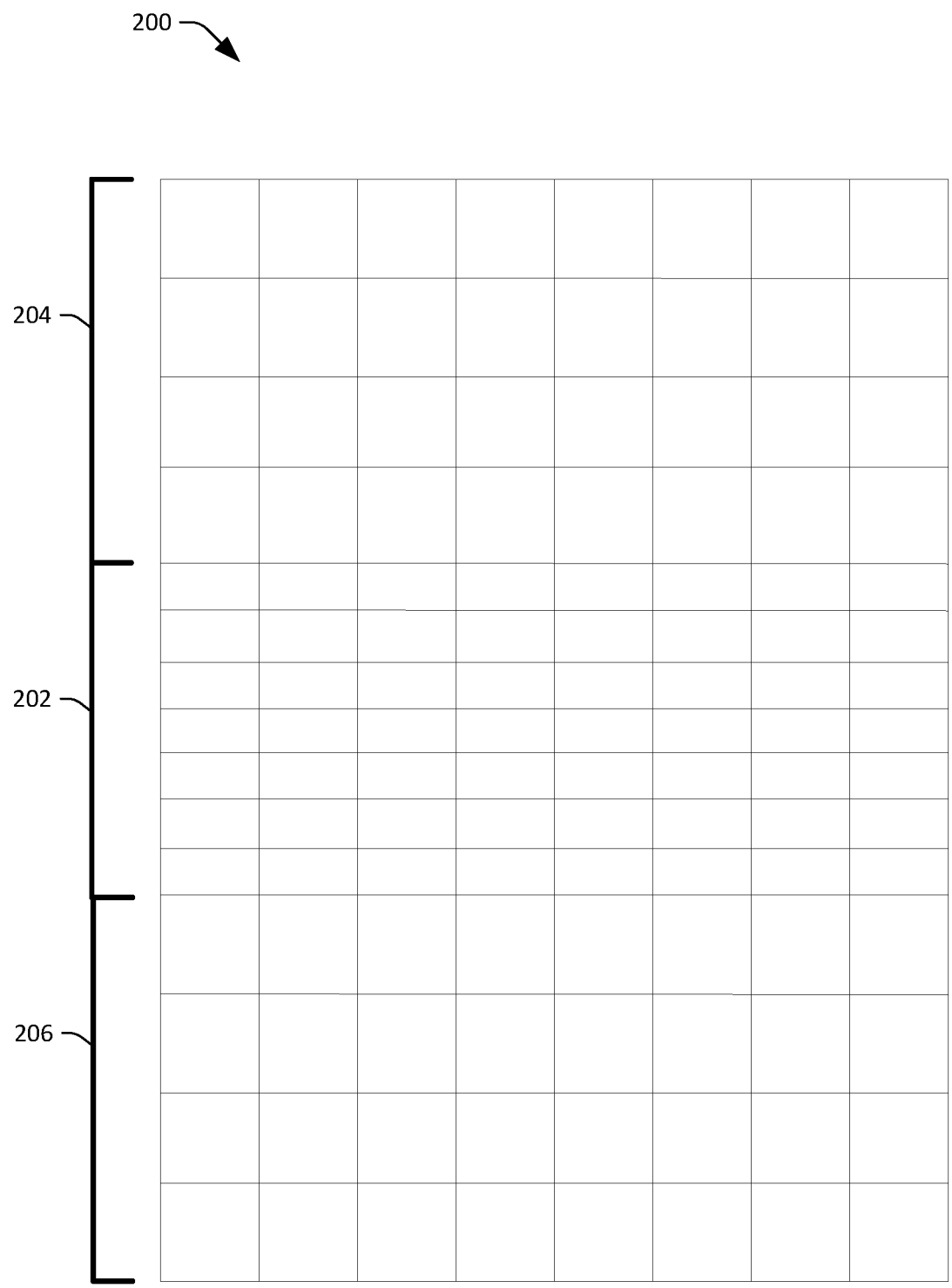
FIG. 2 illustrates an exemplary configuration for data points of a point cloud.
Figure 3:
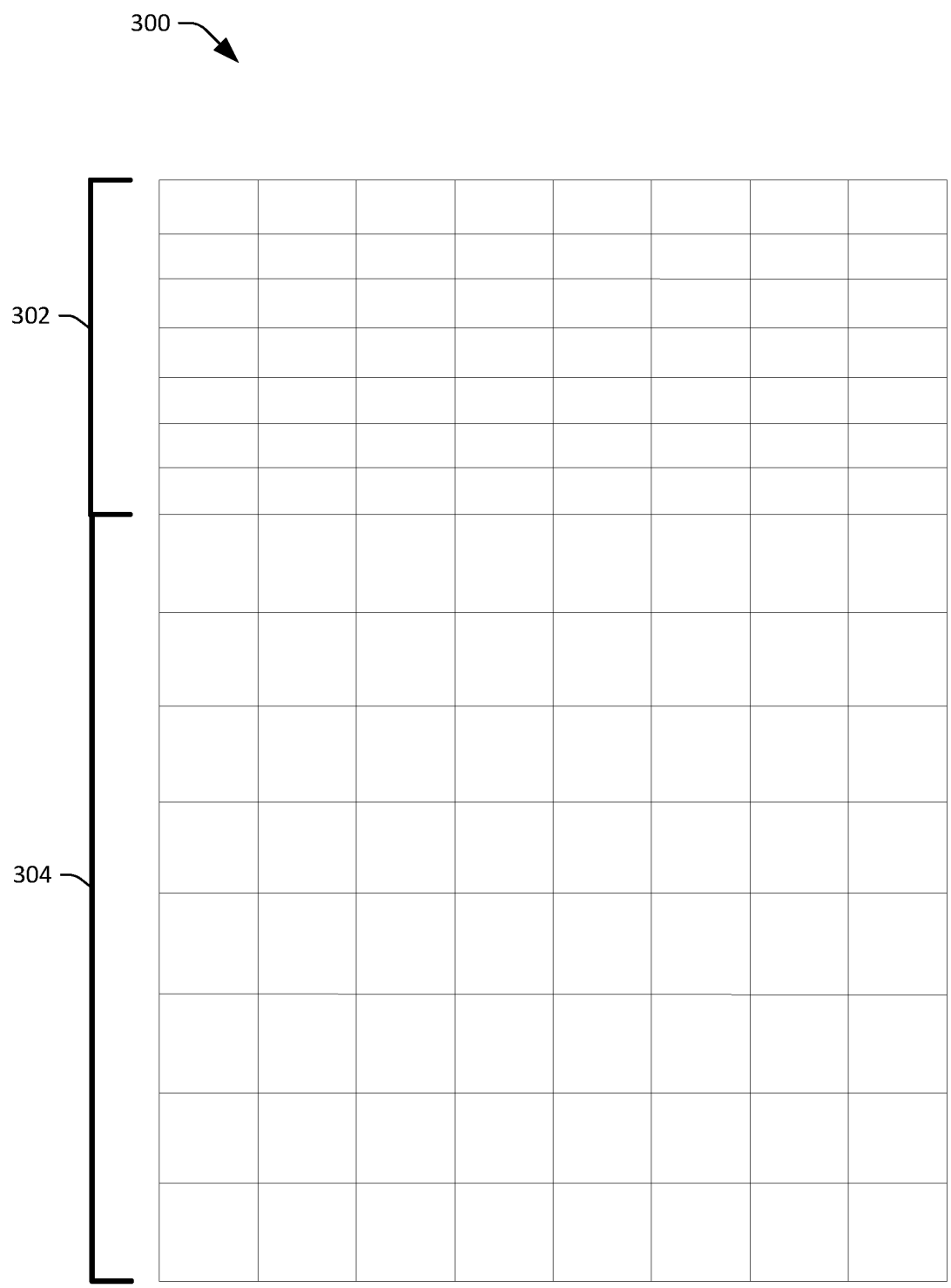
FIG. 3 illustrates an exemplary configuration for data points of a point cloud.
Figure 4:
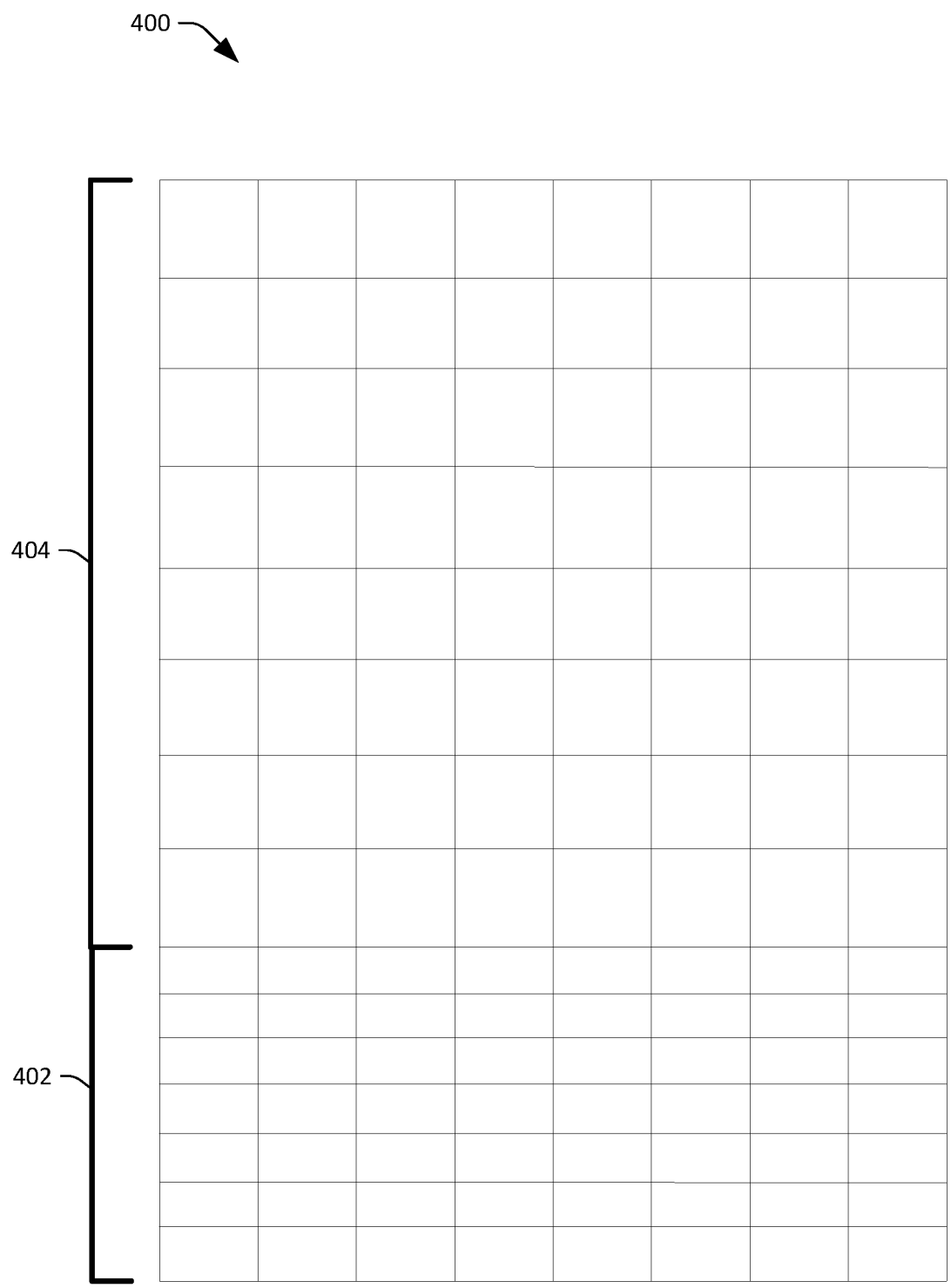
FIG. 4 illustrates an exemplary configuration for data points in a point cloud

With reference now to FIGS. 2-4, point clouds 200, 300, and 400, respectively, represented in two dimensions, are set forth. It can be ascertained that the point clouds 200, 300, and 400 include the same number of points. However, resolutions in different horizontal bands of the point clouds are different. With more specificity, the two-dimensional representations of the exemplary point clouds are illustrated as a grid pattern, wherein each vertex of the grid pattern represents a data point in the point cloud. In particular, each horizontal line corresponds to a separate light emitter positioned vertically along the rotating spindle; and each vertical line corresponds to a degree of rotation of the spindle in the azimuth direction. A vertex formed via a meeting of a horizontal line with vertical line represents a data point indicative of a light pulse emitted by the LIDAR system.

In FIG. 2, the point cloud includes a horizontal band 202 that has a first resolution and horizontal bands 204 and 206 that have a second resolution that is different from the first resolution. The horizontal band 202 may correspond to a region of interest in the field of view of the LIDAR system 106 where higher resolution is desirable when compared to resolution of regions outside of the horizontal band 202. For instance, a higher resolution can be desirable for long range measurements, and the computing system 102 may be able to better detect objects that are represented in the horizontal band 202 at long range. In an example, the horizontal band 202 may be positioned at a mid-section of the point cloud 200 when the autonomous vehicle is navigating flat terrain and when higher resolution is desirable along the horizon.

The horizontal band 202 encompasses an angular range of elevation based on a first value that defines a bottom of the angular range and a second value that defines a top of the angular range. The bottom of the angular range corresponds to a bottom of the horizontal band 202 and a top of the angular range corresponds to a top of the horizontal band 202. When there are a relatively large number of channels, the channel control system 104 can identify the angular range for the horizontal band and can further identify a resolution within the horizontal band. Based upon the angular range and the identified resolution, the channel control system identifies which M of the N channels of the LIDAR system 106 to cause to be active to achieve the desired resolution in the identified angular range.

In FIG. 3, the point cloud 300 includes two horizontal bands 302-304, which comprise a first horizontal band 302 that has a first (high) resolution and a second horizontal band 304 that has a second (low) resolution. The first horizontal band 302 is positioned at an upper portion of the point cloud 300 and the second horizontal band 304 is positioned at a lower portion of the point cloud 300. For instance, if the autonomous vehicle were to navigate an uphill grade, the first horizontal band 302 may correspond to an upward trajectory of the road (e.g., toward the top of the hill) such that a higher resolution is maintained along the horizon of the road.

The computing system 102, as indicated previously, can determine a tilt of the LIDAR system 106 relative to a horizontal plane and can determine angular ranges (horizontal bands) where different resolutions are desired based upon the tilt, and can subsequently identify which M of the N channels of the LIDAR system 106 to cause to be active for a scan and which N-M channels of the autonomous vehicle to cause to be inactive for the scan. The pitch of the LIDAR system may be computed for individual scans of the environment or an angular range of the plurality of dense regions 302-304 may be extended based on a predetermined number that accounts for a pitch of the LIDAR system in general.

In FIG. 4, the point cloud 400 similarly includes two horizontal bands 402-404, which comprise a first horizontal band 402 that has a first (high) resolution and a second horizontal band 404 that has a second (low) resolution. The first horizontal band 402 is positioned at a lower portion of the point cloud 400 and the second horizontal band 404 is positioned at an upper portion of the point cloud 400. For instance, if the autonomous vehicle were to navigate a downhill grade, the first horizontal band 402 may correspond to a downward trajectory of the road (e.g., toward the base of the hill) such that a higher resolution is maintained along the horizon of the road. As noted, the computing system 102 can determine a tilt of the LIDAR system 106 relative to a horizontal plane to determine angular ranges (horizontal bands) where different resolutions are desired based upon the tilt. In particular, the computing system 102 can identify which M of the N channels should be active for a scan of the LIDAR system 106 and which N-M channels should be inactive for the scan of the LIDAR system 106.

It should be appreciated from the foregoing that manipulating a resolution of various bands of a point cloud, as represented by the exemplary point clouds 200, 300, and 400, includes advantages beyond navigating uphill and downhill grades. For instance, navigating opens spaces at high speeds can require the first (high) resolution band to be located at a different position in the point cloud than when navigating tight spaces at low speeds (e.g., inside a parking garage). Additionally, a point cloud generated using only M of the N channels reduces processing demands on the computing system 102 when compared to a computing system that is required to process all N channel.

Figure 5:
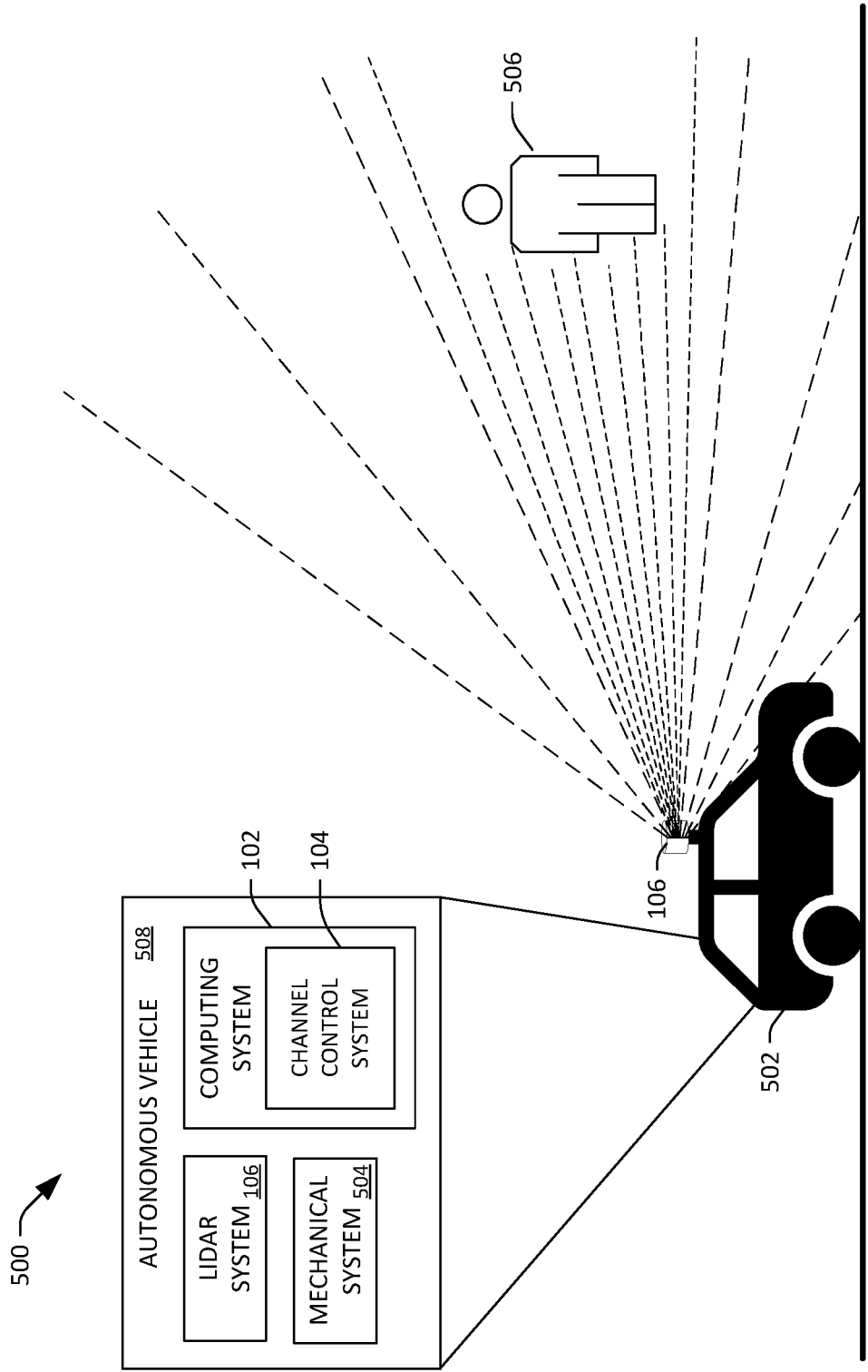
FIG. 5 is a schematic that illustrates a LIDAR system of an autonomous vehicle having channels that are selectively controlled by a computing system thereof.

With reference now to FIG. 5, an exemplary environment 500 is illustrated that includes an autonomous vehicle 502 having the LIDAR system 106 affixed thereto. The autonomous vehicle 502 includes componentry depicted in call-out 508. Hence, the autonomous vehicle 502 comprises the LIDAR system 106 which emits light pulses into the surrounding environment 500, a mechanical system 504 (e.g., a vehicle propulsion system, a steering system, a braking system, etc.), and the computing system 102 that is configured to identify M channels from amongst the N channels of the LIDAR system 106 to activate for each scan of the LIDAR system 106. The computing system 102 is in communication with the LIDAR system 106 and the mechanical system 108 and comprises the channel control system 104, as described above.

The computing system 102 can identify a pedestrian 506 in a field of view of the LIDAR system 106 based upon signals output by sensor system of the autonomous vehicle 502, including the LIDAR system 106. The computing system 102 can compute an angular range in elevation for the LIDAR system 106, wherein such range encompasses the pedestrian 506 in the field of view of the LIDAR system 106. The computing system 102 can then identify channels of the LIDAR system 106 that correspond to such angular range, and can further (optionally) determine a desired resolution of the point cloud for such angular range. The computing system 102 can then transmit a command signal to the LIDAR system 106 that indicates which of the N channels are to be active and which of the N channels are to be inactive during the scan, and the LIDAR system 106 can perform the scan based upon the command signal.

In addition, in embodiments, the autonomous vehicle 502 can include a camera sensor system that generates an image signal that includes the pedestrian 506. The image signal can be provided to the computing system 102, wherein the region can be identified in the field of view based on features captured in the image signal.

Figure 6:
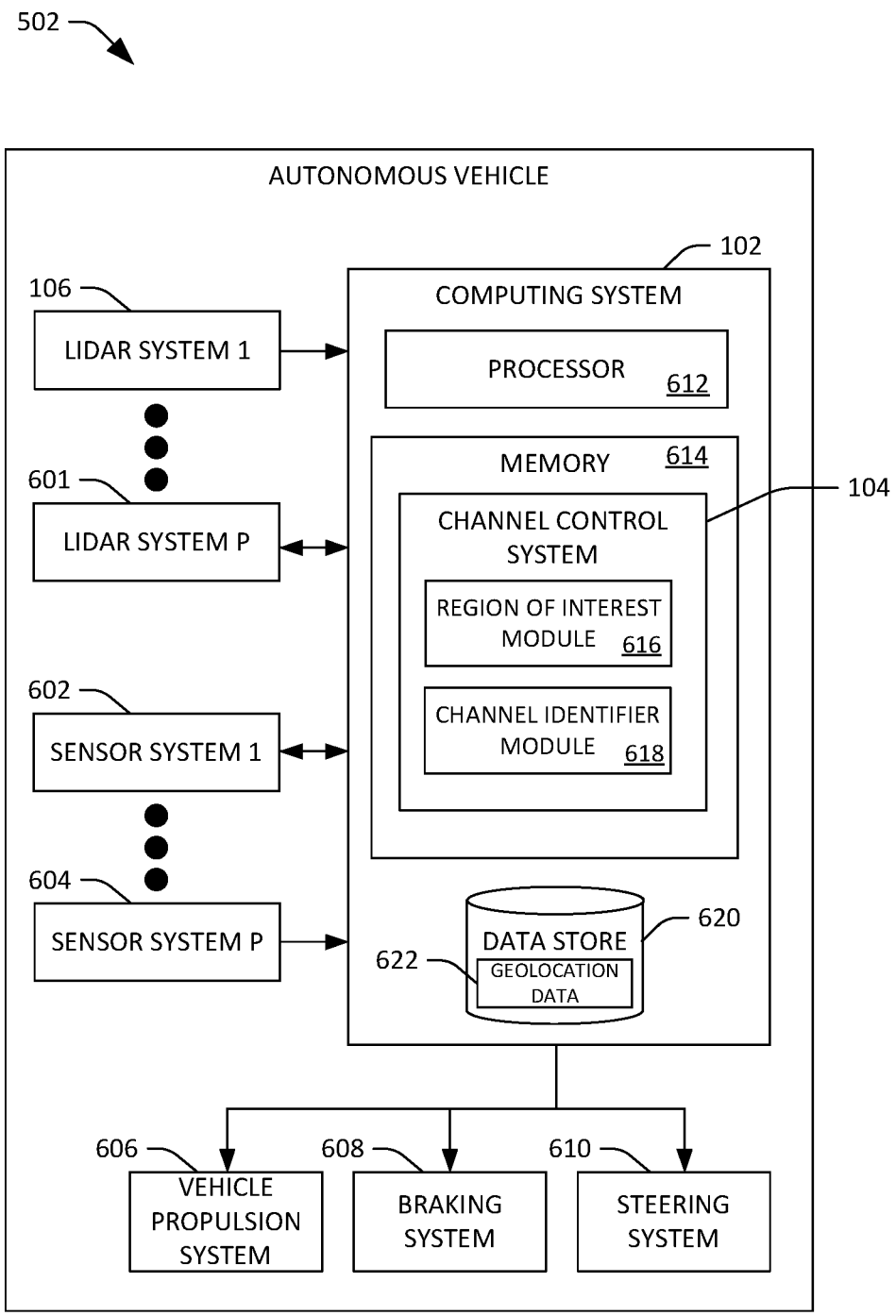
FIG. 6 is a functional block diagram of an exemplary autonomous vehicle.

With reference now to FIG. 6, a functional block diagram of the autonomous vehicle 502 is illustrated. The autonomous vehicle 502 operates based on sensor signals output by LIDAR systems (106, 601) as well as by other sensor systems 602-604. Accordingly, the autonomous vehicle 502 includes a plurality of sensor systems, for example, a first sensor system 602 through a Pth sensor system 604, which can include a first LIDAR system 106 through an Pth LIDAR system 601.

The sensor systems 602-604 can be of different types and are arranged about the autonomous vehicle 502. For example, the first sensor system 602 may be a camera sensor system and the Pth sensor system 604 may be a radar sensor system. Other exemplary sensor systems include global positioning system (GPS) sensor systems, inertial measurement unit (IMU) sensor systems, infrared sensor systems, sonar sensor systems, and the like. Furthermore, some or all of the of sensor systems 602-604 may be articulating sensors that can be oriented or rotated such that a field of view of the articulating sensors is directed towards different areas surrounding the autonomous vehicle 502.

The autonomous vehicle 502 further includes several mechanical systems that can be used to effectuate appropriate motion of the autonomous vehicle 502. For instance, the mechanical systems can include but are not limited to a vehicle propulsion system 606, a braking system 608, and a steering system 610. The vehicle propulsion system 606 may include an electric motor, an internal combustion engine, or both. The braking system 608 can include an engine brake, actuators, and/or any other suitable componentry that is configured to assist in decelerating the autonomous vehicle 502. The steering system 610 includes suitable componentry that is configured to control the direction of movement of the autonomous vehicle 502 during propulsion.

The autonomous vehicle 502 additionally comprises the computing system 102, which is in communication with the sensor systems 602-604 (e.g., the LIDAR systems (106, 601)) and the mechanical systems 606-610. The computing system 102 comprises a data store 620 having geolocation data 622 stored therein, a processor 612, and memory 614 that includes instructions that are executed by the processor 612. In an example, the processor 612 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Memory 614 includes the channel control system 104, wherein the channel control system 104 further comprises a region of interest module 616 and a channel identifier module 618. The region of interest module 616 is executed by the processor 612 to identify one or more regions of interest in a field of view of the LIDAR systems (106, 601), where resolution of a point cloud generated by a LIDAR system is to be higher in the region of interest than resolution of the point cloud outside the region of interest. The region of interest may be identified based on the geolocation data 622, from an image signal provided by a camera sensor system, based upon data output by another sensor system, or the like. For instance, the geolocation data 622 may correspond to map data indicative of features/objects located in the field of view of the LIDAR systems (106, 601).

The channel identifier module 618 is executed by the processor 612 to identify channels of the LIDAR systems (106, 601) that emit light pulses which correspond to locations inside the region of interest. Upon identification of the corresponding channels, the channel control system 104 can control a number of the corresponding channels to emit light pulses based on a desired resolution of the point cloud inside the region of interest. In an example, the computing system 102 may be configured to process point clouds generated based upon output of 16 channels of a LIDAR system; however, the LIDAR system 106 may comprise 32 channels, 8 of which correspond to the region of interest identified by the region of interest module 616. In this example, the channel identifier module 618 can identify the 8 channels that correspond to the region of interest, such that the control system 104 may control the LIDAR system 106 to cause the 8 channels to be active (as well as 8 other channels that may be evenly spaced from one another outside the region of interest) to output a point cloud that is generated based on output of 16 channels of the LIDAR system 106.

Figure 7:
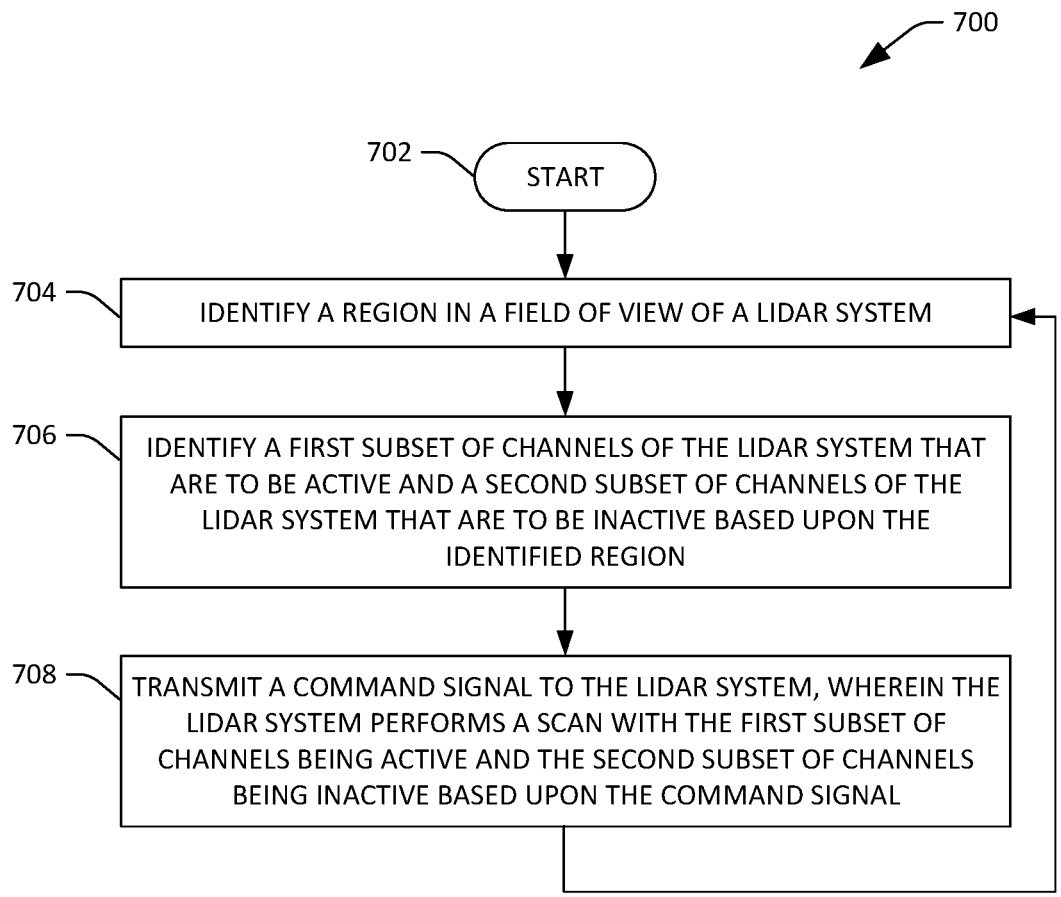
FIG. 7 is a flow diagram illustrating an exemplary methodology for manipulating a resolution within a region of a point cloud having a predefined number of points.
Figure 8:
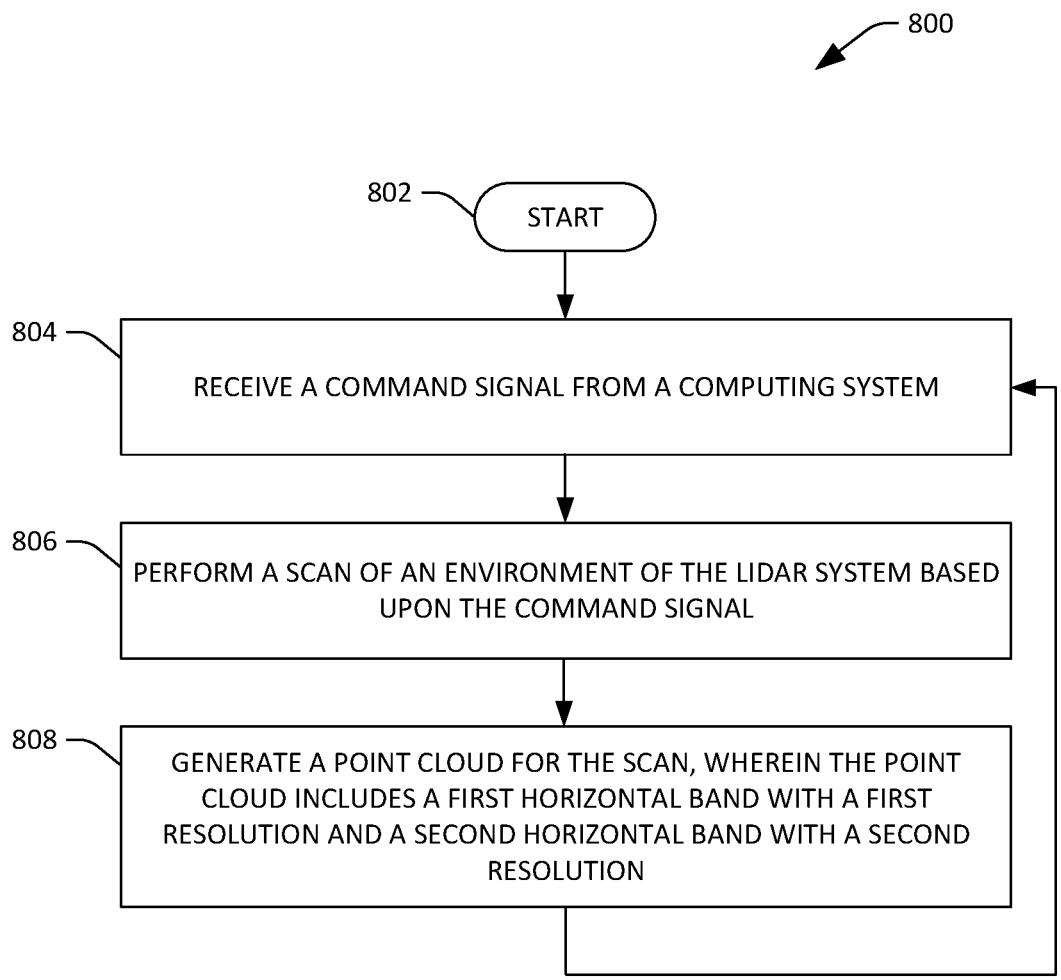
FIG. 8 is a flow diagram illustrating an exemplary methodology for identifying a channel of a LIDAR system that is to be enabled for generation of a point cloud indicative of a surrounding environment.

FIGS. 7-8 illustrate exemplary methodologies relating to generating a point cloud having horizontal bands with different resolutions therein. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for controlling a LIDAR system is illustrated. The methodology 700 can be performed by the computing system 102 of the autonomous vehicle 502. The methodology 700 starts at 702, and at 704 for a scan of a LIDAR system, a region is identified in a field of view of the LIDAR system, wherein resolution in a first horizontal band of a point cloud to be generated by the LIDAR system is greater than resolution in a second horizontal band of the point cloud, wherein the first horizontal band corresponds to the region. At 706, a first subset of channels of the LIDAR system that are to be active are identified based upon the identified region, and a second subset of the channels of the LIDAR system that are to be inactive are identified based upon the identified region. Hence, in a point cloud generated by the LIDAR system with respect to the scan, the point cloud will include a first horizontal band that has a first resolution and a second horizontal band that has a second resolution, wherein the first horizontal band encompasses the region, and further wherein the first resolution is higher than the second resolution. At 708, a command signal is transmitted to the LIDAR system that causes the LIDAR system to perform the scan with the first subset of channels being active and the second subset of channels being inactive. The methodology 700 returns to 704 for a subsequent scan.

Referring now to FIG. 8, an exemplary methodology 800 for performing a LIDAR scan is illustrated, wherein the methodology 800 is performed by the LIDAR system 106. The methodology 800 starts at 802, and at 804 the LIDAR system receives a command signal from a computing system. The command signal includes an indication, for each channel of the LIDAR system, as to whether the channel is to be active or inactive for the scan. At 806, the LIDAR system performs a scan of its environment based upon the command signal, wherein a first subset of channels of the LIDAR system are active and a second subset of channels of the LIDAR system are inactive. At 808, the LIDAR system generates a point cloud based upon the scan, wherein the point cloud includes a first horizontal band that has a first resolution and a second horizontal band that has a second resolution, wherein the first resolution is different from the second resolution. The methodology 800 returns to 804 with respect to a subsequent scan.

Figure 9:
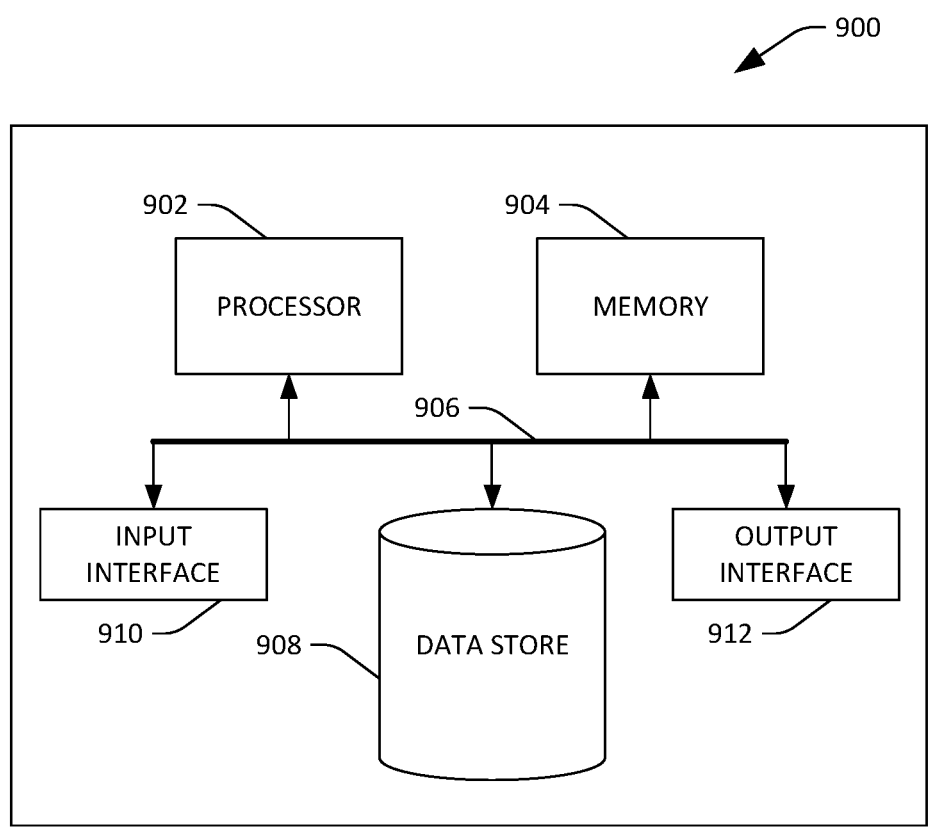
FIG. 9 illustrates an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 102. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store information related to geospatial position data, LIDAR channel identifiers, and the like.

The computing device 900 additionally includes a data store 908 that is accessible by the processor 902 by way of the system bus 906. The data store 908 may include executable instructions, geolocation data, point clouds, and the like. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may transmit control signals to the LIDAR systems (106, 601) and other sensor systems 602-604, the vehicle propulsion system 606, the braking system 608, and/or the steering system 610 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A LIDAR system comprising:
N light emitters; and
N light detectors that respectively correspond to the N light emitters such that the LIDAR system comprises N channels, wherein for a scan of the LIDAR system the LIDAR system is configured to:
deactivate M channels of the LIDAR system such that N-M channels of the LIDAR system are active for the scan, wherein N is greater than M; and
generate a point cloud based upon the N-M channels being active and the M channels being inactive, wherein the point cloud is indicative of location of objects relative to the LIDAR system, and further wherein the point cloud includes points that have differing resolutions.

2. The LIDAR system of claim 1, wherein the LIDAR system is further configured to transmit the point cloud to a computing system of an autonomous vehicle (AV), wherein the computing system of the AV causes the AV to perform a driving maneuver based upon the point cloud.

3. The LIDAR system of claim 1, wherein N is 32 and M is 16.

4. The LIDAR system of claim 1, wherein the point cloud comprises a first horizontal band and a second horizontal band that is non-overlapping with the first horizontal band, wherein the first horizontal band has a first resolution and the second horizontal band has a second resolution that is different from the first resolution.

5. The LIDAR system of claim 1, wherein at least two of the N-M channels that are active are vertically adjacent to one another on a spindle of the LIDAR system.

6. The LIDAR system of claim 1, wherein the LIDAR system deactivates the M channels based upon a signal received from a computing system that is in communication with the LIDAR system.

7. The LIDAR system of claim 1, where M is equal to N/2.

8. The LIDAR system of claim 1, wherein the N channels are aligned vertically along a spindle of the LIDAR system.

9. The LIDAR system of claim 1, wherein the LIDAR system is further configured to:
for a second scan of the LIDAR system that is subsequent the scan, activating a channel in the N channels that was deactivated during the scan.

10. The LIDAR system of claim 1, wherein the LIDAR system is further configured to:
for a second scan of the LIDAR system that is subsequent the scan, deactivating a channel in the N channels that was activated during the scan.

11. The LIDAR system of claim 1 being incorporated into an autonomous vehicle.

12. A method performed by a LIDAR system having N channels, the method comprising:
performing a first scan of an environment of the LIDAR system, wherein a first point cloud is generated for the first scan based upon output of a first light detector in a first channel of the LIDAR system;
immediately subsequent to performing the first scan of the environment, deactivating the first channel of the LIDAR system and activating a second channel of the LIDAR system that was deactivated during the first scan; and
performing a second scan of the environment of the LIDAR system, wherein a second cloud is generated for the second scan based upon output of a second light detector in the second channel of the LIDAR system.

13. The method of claim 12, wherein the first channel of the LIDAR system and the second channel of the LIDAR system are adjacent to one another along a spindle of the LIDAR system.

14. The method of claim 12, wherein the LIDAR system includes N channels, and further wherein during each of the first scan and the second scan M of the N channels are deactivated, where M is greater than 0 and less than N.

15. The method of claim 14, where N is 32 and M is 16.

16. The method of claim 14, where N is 64 and M is 32.

17. The method of claim 12, wherein the LIDAR system is a spinning LIDAR system.

18. The method of claim 12, further comprising:
transmitting the first point cloud and the second point cloud to a computing system of an autonomous vehicle (AV), wherein the AV performs a driving maneuver based upon the first point cloud and the second point cloud.

19. A spinning LIDAR system comprising:
N channels, wherein each channel is a light emitter/light detector pair, wherein the spinning LIDAR system is configured to perform acts comprising:
activating first channels from amongst the N channels for a first scan of an environment of the LIDAR system;
performing the first scan of the environment of the LIDAR system when the first channels are activated, wherein the LIDAR system, for the first scan, generates a first point cloud based upon outputs of the first channels;
immediately subsequent to performing the first scan of the environment of the LIDAR system, activating second channels from amongst the N channels for a second scan of the environment of the LIDAR system, wherein the second channels include a channel not included in the first channels; and
performing the second scan of the environment of the LIDAR system when the second channels are activated, wherein the LIDAR system, for the second scan, generates a second point cloud based upon outputs of the second channels.

20. The spinning LIDAR system of claim 19, wherein a second channel is included in both the first channels and the second channels.

* * * * *